United States Patent [19]
Fick et al.

[11] 3,751,967
[45] Aug. 14, 1973

[54] SAMPLING DEVICE
[75] Inventors: Robert L. Fick; Allen H. Markey, both of Midland, Mich.
[73] Assignee: The Dow Chemical Company, Midland, Mich.
[22] Filed: Dec. 14, 1970
[21] Appl. No.: 97,848

[52] U.S. Cl............................ 73/23, 55/240, 55/270
[51] Int. Cl. ............................................. G01n 31/00
[58] Field of Search........... 73/170, 28, 23, 421.5 R; 55/240, 241, 270

[56] References Cited
UNITED STATES PATENTS
| | | | |
|---|---|---|---|
| 3,250,128 | 5/1966 | Cassel | 73/422 R |
| 3,459,047 | 8/1969 | Sumansky | 73/421.5 |
| 3,473,388 | 10/1969 | Lynn | 73/422 R |
| 3,518,816 | 7/1970 | Jalma | 55/240 |
| 2,225,954 | 12/1940 | Grubb | 261/DIG. 44 |

OTHER PUBLICATIONS
Buffalo Ad. – Bulletin AP225 received in patent office Sept. 24, 1965 Original filed in 55/240 pages 1–4.

Primary Examiner—Herbert Goldstein
Attorney—Gridwold & Burdick, William R. Norris and Lloyd S. Jawanovitz

[57] ABSTRACT

A device and method for determining the presence of a contaminant in a gaseous atmosphere. The device comprises a flow regulatable source of a liquid, a spaced apart liquid receiver, and a surface means on which a liquid film is formed and guided from the liquid source to the receiver. A means to measure the presence of contaminant in the liquid is a part of the device. The device is especially useful for determining the presence of a chemically active pollutant in a gaseous phase.

11 Claims, 3 Drawing Figures

PATENTED AUG 14 1973 3,751,967

INVENTORS.
Robert L. Fick
Allen H. Markey

BY

Griswold & Burdick
ATTORNEYS

3,751,967

SAMPLING DEVICE

BACKGROUND OF THE INVENTION

This invention relates to a measuring and testing device. More particularly, the invention concerns a sampling device having therein a receptacle for a liquid.

Frequently it is desirable or necessary to determine the presence and/or concentration of a contaminant in a gaseous atmosphere. Instruments for ascertaining the concentration of smoke in the air utilizing a visible light source are available. However, employment of such an instrument usually requires that the location of analysis be darkened, that is, visible light must be excluded from the test area. Additionally, such equipment normally requires that the pollutant be dark in color. Equipment for analyzing light colored or translucent air-borne contaminants in an area exposed to visible light is needed.

It is, therefore, an object of this invention to provide a device capable of collecting and analyzing contaminants in gaseous atmospheres.

It is another object of this invention to provide a device capable of analyzing chemically active contaminants in gaseous atmospheres exposed to visible light.

Other objects and advantages of this invention will become apparent during the course of the following description.

SUMMARY OF THE INVENTION

The above objects and advantages have been achieved in a device comprising a flow regulatable liquid source means and a liquid receiver spaced apart from the source means by a surface means. A liquid film can be formed and a liquid flow guided from the source means to the liquid receiver by the surface means. A means for measuring the presence and, optionally, the concentration of a contaminant in the liquid is connected to the liquid receiver.

The aforementioned device finds utilization by passing a contaminated gas flow over the surface means and simultaneously flowing a liquid on the exterior of said surface means so that the gas contacts the liquid. The liquid entraps and, preferably, at least partially dissolves the air-borne contaminant as the liquid flows across the surface means. The liquid receiver collects the contaminated liquid, said liquid passing therefrom to a measuring means where the presence of contaminant in the liquid can be determined.

The liquid is characterized as being sufficiently fluid to flow across the surface means and sufficiently nonvolatile to have at least an adequate amount of liquid collect in the receiver for measuring.

DESCRIPTION OF THE DRAWINGS

The accompanying drawings further illustrate the invention.

Identical numerals, distinguished by a letter suffix, within the several figures represent parts having a similar function within the different embodiments.

DESCRIPTION OF THE PREFERRED EMBODIMENTS

Figure 1:
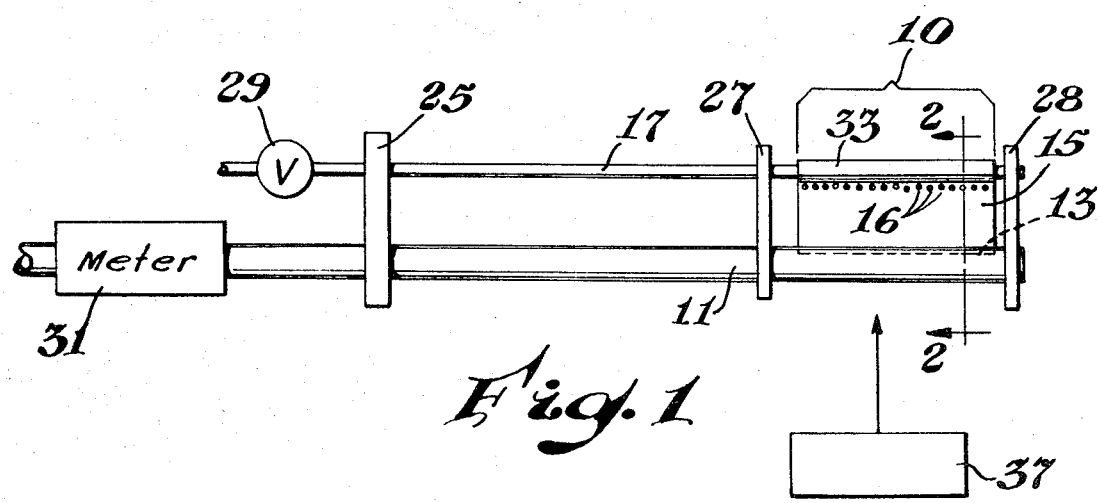
FIG. 1 depicts an embodiment of the invention including a sample collector 10 at one end.
Figure 2:
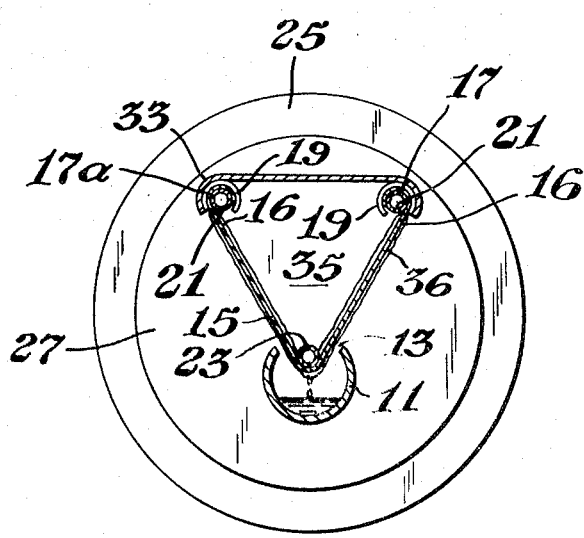
FIG. 2 is an end view of the device along plane 2—2.

FIGS. 1 and 2 depict a liquid receiver such as a channel, trough, or clyindrical pipe 11 having at one end a slot or opening 13. Disposed within opening 13 is a surface means or perforated strip 15. Perforated strip 15, having a multiplicity of passages 16 therethrough, is supported by an elongated flow regulatable liquid source means, for example, a tube, pipe, or conduits 17 and 17a. Shaped clips 19 provide means for tightly detachably attaching perforated strip 15 to conduits 17 and 17a.

The wall sections of conduits 17 and 17a define at least one port or hole 21 directed toward strip 15. For better liquid flow the wall sections of conduits 17 and 17a define a longitudinal slot or a plurality of holes 21. The holes 21 are positioned in said conduits adjacent to and directed toward perforated strip 15. A tension member or weight 23 is positioned in contact with perforated strip 15 to maintain said strip within opening 13 in cylindrical pipe 11. Preferably, strip 15 is taut between conduits 17 and 17a and pipe 11.

Cylindrical pipe 11 and conduits 17 and 17a extend through a first support member 25 and optional second and third support members 27 and 28, respectively. First support member 25 provides means to affix the sampling device to another body, such as, a wall of a chimney. To maintain cylindrical pipe 11 and conduits 17 and 17a in a spaced apart relationship at least one second support 27 can be effectively employed. said second support can be a plate having cylindrical pipe 11 and conduits 17 and 17a extending therethrough or can be rod like members simultaneously affixed to conduits 17 and 17a and/or cylindrical pipe 11. The second and third supports 27 and 28 beneficially assist in increasing the rigidity of the device and in maintaining the aforesaid spaced apart relationship and avoiding substantial flexing of the device in use.

A flow regulating valve 29 is located in series with conduits 17 and 17a to provide means to regulate the liquid flow to holes 21. However, individual regulating valves for each conduit provide better performance of the device by enabling superior control and uniformity of liquid flow.

A measuring means or meter 31 is connected in series with cylindrical pipe 11. Meter 31 can be of a type that will measure liquid sample color, conductivity, density, oxidation reduction potential, pH and the like.

To minimize loss of contaminated liquid from the device, it is highly beneficial that a substantially gas impervious shield 33 be mounted to extend from conduit 17 to conduit 17a. It is also desirable that shield 33 extend longitudinally between said conduits for a similar distance as strip 15. Shield 33 can be adapted to retain strip 15 on conduits 17 and 17a, thereby negating the need for clips 19. Shield 33 is believed to cause an increase in gas pressure within an opening 35 defined by strip 15 and shield 33. The pressure increase in opening 35 inhibits the gas flow from passing through the perforated strip 15 to opening 35. Loss of liquid droplets from the strip 15 by blowing upwardly in the gas stream through opening 35 is thereby minimized. The shield 33 is characterized as being substantially gas impervious when insufficient gas passes through said shield to cause blowing of liquid from strip 15 into opening 35 and upwardly in the gas stream.

In operation, a liquid or for even better performance a fluid contaminant solvent such as acetone, alcohol, ethylene glycol, carbon tetrachloride, trichloroethylene, water, and compatible combinations thereof is supplied through regulating valve 29 and conduits 17 and 17a to holes 21 in said conduits. The fluid sprays in a generally uniform pattern through holes 21 onto perforated strip 15 to form a film thereon. At least a part of the liquid passes through passages 16 to side 36 of strip 15 and forms a film on side 36. The passages 16 in strip 15 can be of regular or irregular shape in said strip. The pattern of the passages 16 can be a single row as in FIG. 1. A more uniform and effective film, however, can be obtained on side 36 when there are a multiplicity of passages extending through strip 15. The multiplicity of passages can form a multiplicity of either generally linear or randomized rows in said strip. The film of liquid flows down the surfaces of strip 15 into liquid receiver 11. Simultaneously with the flowing of liquid over the surface of strip 15 a current of gas eminating from a contaminated gas producing source 37 impinges upon the surface of strip 15. Improved accuracy and rapidity of analysis are realized when the gas strikes the fluid covered surface of strip 15 at an angle greater than about 20° and less than about 90°. Therefore, it is desired the surface means be positioned in a plane angularly disposed to the major direction of the gas flow.

A portion of the contaminants or pollutants in the gaseous stream dissolve or become suspended in the liquid as the liquid flows in a thin film across the surfaces of strip 15. The contaminated liquid accumulates in receiver 11 and flows toward meter 31 where an analysis of the contaminant can be obtained. The time elapsed between initial dissolution and/or entrapment of the contaminant in the liquid and the analysis can be less than 15 seconds. For example, water can be employed as a liquid and a variation in acidity readily and rapidly conducted by a commercially available pH meter. When response time is not critical the measuring device 31 can be located at a position spaced apart from liquid receiver 11. In such an instance, the contaminated liquid can be discharged through an additional tube or pipe connecting liquid receiver 11 and meter 31.

Additionally, it is preferable that a portion of strip 15 extend upwardly and outwardly from hollow cylindrical pipe 11 to conduits 17 and 17a. In this position a stream of gas can flow upwardly about cylindrical pipe 11 and directly impinge upon the surface of strip 15 to afford at least partial mixing, dissolution or dispersion of a gas borne contaminant in the liquid.

Figure 3:
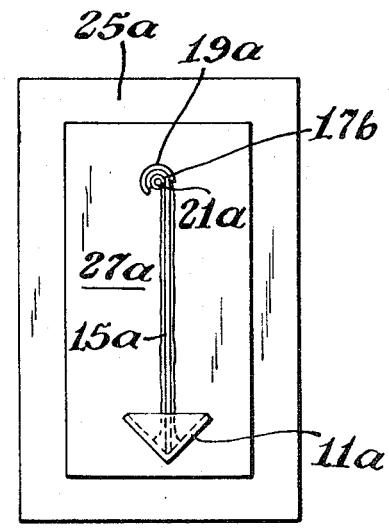
FIG. 3 is an end view of another embodiment of the invention.

In the embodiment of FIG. 3 a surface means or perforated strip 15a is detachably attached to a flow regulatable liquid source means or conduit 17b by shaped clips 19a. The lower edge of strip 15a is detachably attached to a V-shaped trough 11a by means of a friction joint, clamp, adhesive or the like. A hole or orifice 21a in conduit 17b is positioned adjacent to and directed at perforated strip 15a. Trough 11a and conduit 17b extend through a first support 25a and optionally through a second support 27a.

Operation of the embodiment depicted in FIG. 3 is similar to that previously described for the device shown in FIGS. 1 and 2.

In the hereinbefore described embodiments it is highly desired that at least a portion of the device exposed to a gaseous phase containing a chemically active pollutant be constructed of a material chemically resistant to the corrosive effects of the atmosphere and contaminant.

The surface means or strip having a multiplicity of passages therethrough can be a metallic or nonmetallic fabric, plurality of generally upwardly extending filaments, or screen of a material chemically resistant to the liquid, gas, contaminant, and combinations thereof. Materials such as stainless steel and especially glass fiber are preferred. A uniform flow of liquid can be attained by spraying a liquid toward the surface of a glass fiber strip through spaced apart holes in the source means or conduit. It is, moreover, preferable that liquids pass through a slot in the side of the conduit adjacent and directed at the glass fiber strip. Utilization of a slot for passing the liquid is conducive to the forming of a more uniform film of liquid on the glass fiber surface.

Response time to variation of contaminant concentration in the gaseous atmosphere can be reduced by constructing the hereindescribed device so that the liquid receiver or cylindrical pipe will be canted toward the measuring means or meter. An angle from horizontal sufficient to avoid accumulation of contaminated liquid within the solvent receiver is satisfactory. For example, an angle of about 5° is adequate for this purpose.

By way of further illustration, a device similar to that as hereinbefore described for the embodiment of FIGS. 1 and 2 having two spaced apart sample collectors was positioned in a 2,4-Dichlorophenoxy acetic acid (2,4-D) drier flue system. The first support member was removably attached to the exterior of the flue. Second and third support members were positioned as in FIG. 1 to add rigidity to the device while it was cantilevered in the flue system. In the device of this illustration the glass fiber fabric strips of each sample collector were spaced apart by a forth support member. The device was constructed of a polyether plastic commercially available under the trade designation "Penton" to provide resistance to heat and the 2,4-D contaminated atmosphere.

Pressurized tap water supplied to ½ inch diameter conduits were regulated by individual valves to maintain the flow to each of the conduits at 15 cubic centimeters per minute. The water sprayed from 1/16 inch diameter holes, spaced apart by ½ inch of conduit surface, in the conduit onto the inner surface of a glass fiber fabric and flowed in a substantially uniform pattern on both sides of the fabric into a hollow cylindrical pipe. Concurrently with the flow of water, heated air rising in the flue system at a rate of approximately 10,000 cubic feet per minute contacted the water film on the exterior surface of the glass fiber strip at an angle of about 30°. A previously calibrated pH meter connected to the pipe measured changes in the water acidity. An increase in water acidity corresponded to an increase in the relative concentration of the light colored, water-soluble, chemically reactive 2,4-D particulate present in the air impinging upon the water film on the glass fiber. A pH measurement, which was translatable into the contamination concentration in the gaseous flow, was obtained within approximately 15 seconds from the initial contact of contaminant with the water.

As is apparent from the foregoing specification, the device of the present invention is susceptible of being embodied with various alterations and modifications, which may differ from those described in the preceding description. For this reason, it is to be fully understood that all of the foregoing is intended to be illustrative and not to be construed or interpreted as being restrictive or otherwise limiting the present invention.

What is claimed is:
1. A sampling device comprising:
   a. a flow regulatable liquid source means;
   b. a liquid receiver spaced apart from said source means;
   c. a surface means on which to form a liquid film and guide a liquid flow from said source means to said liquid receiver;
   d. a substantially gas impervious shield adapted to minimize loss of the contaminated liquid from the device;
   e. a means for measuring the presence of a contaminant in the liquid; and
   f. a means to mount the device in a gas flow without substantially obstructing the gas flow.

2. The device of claim 1 in which said source means is a pipe having a plurality of ports therein directed toward said surface means.

3. The device of claim 1 in which said surface means is a perforated strip.

4. The device of claim 1 in which said measuring means is a pH meter.

5. A method comprising:
   a. positioning a sampling device in an environment subject to a gas flow, the device comprising a flow regulatable liquid source means, a liquid receiver spaced apart from the source means, a surface means on which to form a liquid film and to guide a liquid flow from the source means to the liquid receiver, a means for measuring the presence of a contaminant in the liquid, and a means to mount the device in a gas flow without substantially obstructing the gas flow;
   b. passing a gas flow over the surface means;
   c. flowing a liquid on the exterior of the surface means simultaneously with step (b) whereby the liquid entraps contaminant contained in the gas;
   d. shielding the surface means to minimize loss of the liquid in the gas flow; and
   e. determining the presence of the contaminant in the liquid.

6. The method of claim 5 including positioning the surface means in a plane angularly disposed to the major direction of the gas flow.

7. The method of claim 5 in which a contaminant solvent is collected by said receiver.

8. The method of claim 7 in which the pH of the contaminated solvent is measured.

9. The method of claim 5 including producing contaminated gas before step (b).

10. The method of claim 5 in which a 2,4-Dichlorophenoxy acetic acid contaminated gas flow is passed over said surface means.

11. A sampling device comprising:
    a. two flow regulatable liquid source means;
    b. a liquid receiver spaced apart from said source means;
    c. a perforated strip on which to form a liquid film and guide a liquid flow from said source means to said liquid receiver;
    d. a substantially gas impervious shield extending between said source means;
    e. a means for measuring the presence of a contaminant in the liquid; and
    f. a means to mount the device in a gas flow without substantially obstructing the gas flow.

* * * * *